S. A. KNAPP.
KELP HARVESTER.
APPLICATION FILED MAR. 25, 1913.
1,120,206.
Patented Dec. 8, 1914.
2 SHEETS—SHEET 2.
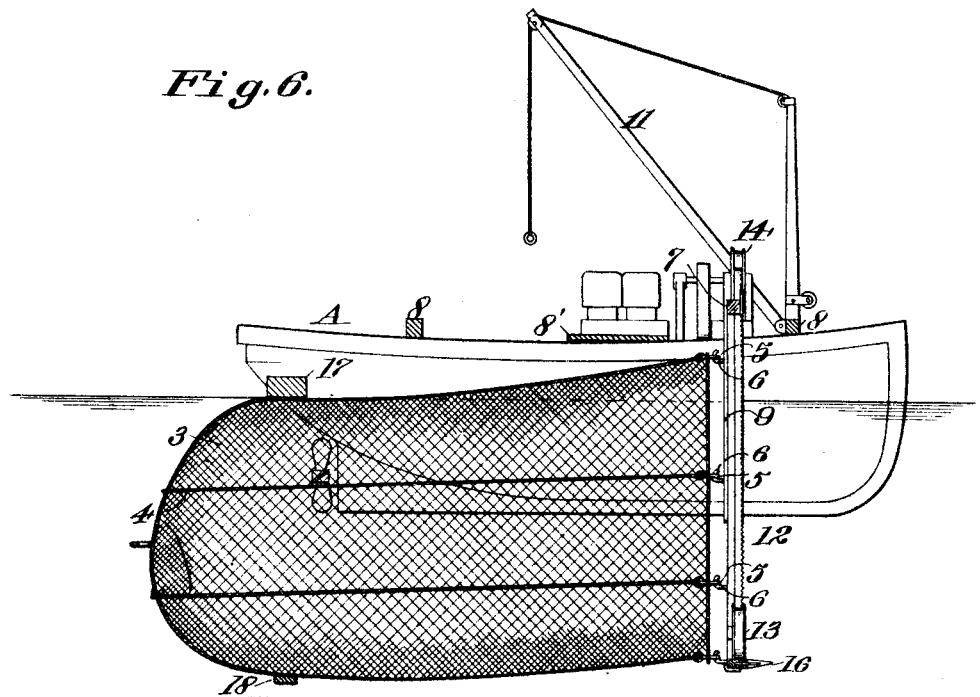
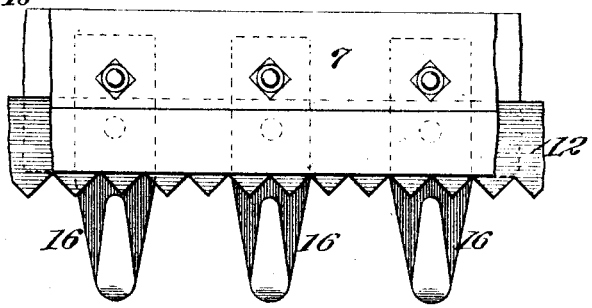
WITNESSES:
INVENTOR
Sewell A. Knapp,
BY G. H. Strong,
ATTORNEY

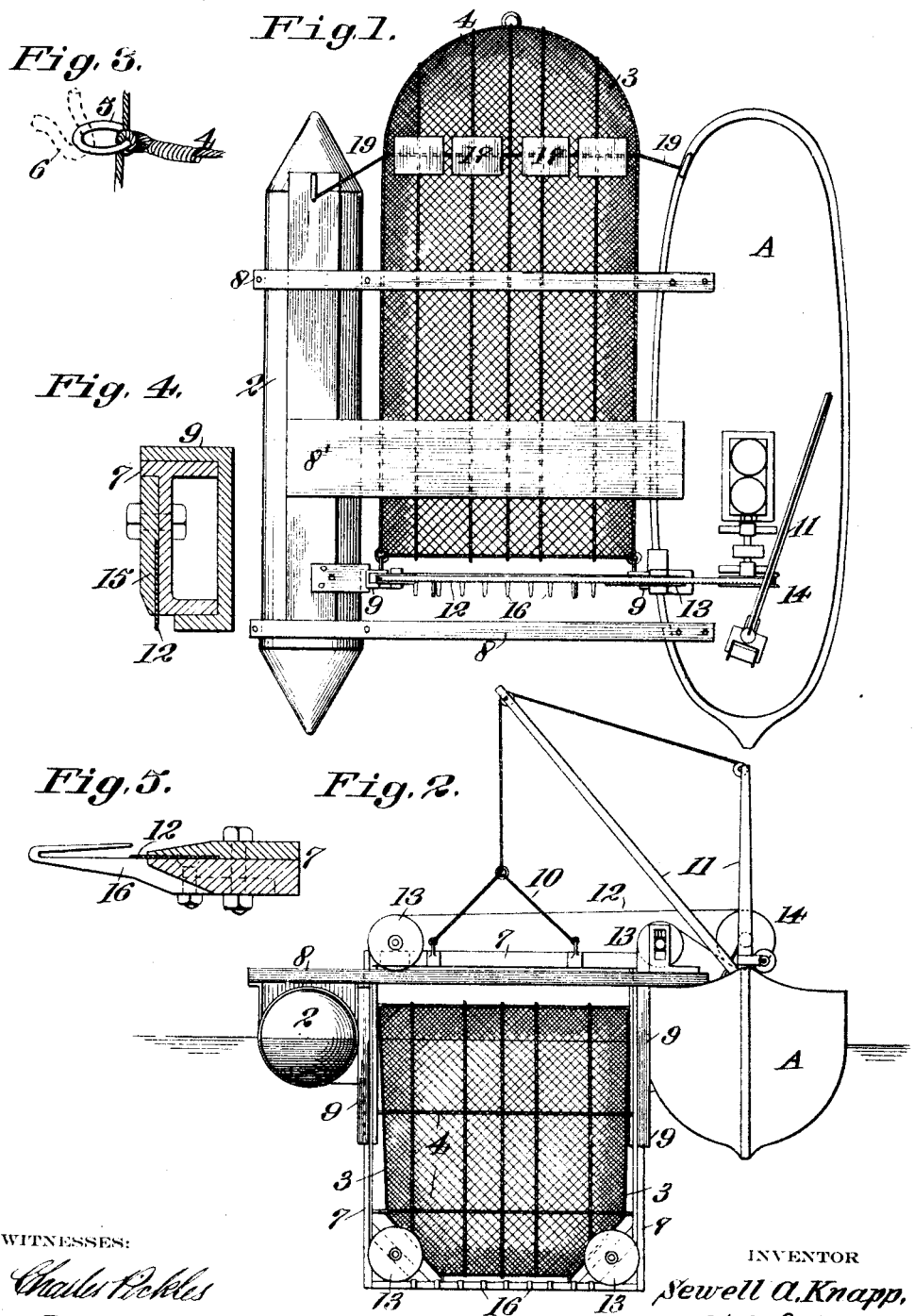

UNITED STATES PATENT OFFICE.

SEWELL A. KNAPP, OF SAN FRANCISCO, CALIFORNIA, ASSIGNOR OF ONE-HALF TO HARRY A. WILSON, OF SAN FRANCISCO, CALIFORNIA.

KELP-HARVESTER.

1,120,206.  Specification of Letters Patent.  Patented Dec. 8, 1914.

Application filed March 25, 1913. Serial No. 756,658.

*To all whom it may concern:*

Be it known that I, SEWELL A. KNAPP, a citizen of the United States, residing in the city and county of San Francisco and State of California, have invented new and useful Improvements in Kelp-Harvesters, of which the following is a specification.

This invention relates to a means for handling sea kelp in harvesting same by use of nets.

It has for its purposes: 1.—To reduce cost of harvesting the kelp. 2.—To save a portion of the valuable parts of the kelp otherwise lost by ordinary methods in use. 3.—To save the expense of, and danger of loss of barges for transporting the kelp from its natural beds to the shore, to works where same is treated, to points for transshipment. 4.—To permit the use of a single low power unit in place of expensive high power sea going tugs, and equally expensive sea going barges. 5.—To save time in cutting and harvesting the kelp. The saving of time would come from continuous operation, as the periods of harvest would not be subject to the changes of the wind and tide. 6.—To avoid contamination of kelp, and consequent increase of expense in treatment of same. 7.—To afford an economical means of handling the kelp in large quantities quickly. 8.—To avoid manual labor to a great extent, in the harvesting, transportation, and delivery of the kelp from its natural beds to the shore, to the works on the shore where same is treated, to a landing for commercial purposes, to a point for trans-shipment.

The strands of kelp (leaves and stems) are intertwined, and in many instances, gathered into considerable masses, making any method of hoisting same into barges, difficult and dangerous to the equipment employed in cutting same, in the heavy sea often encountered, as well as expensive. This is avoided by using a suitable net or compartment, which is hereinafter described; this net following immediately after the cutting knife and the lower portion of the open end of the net being attached to the supporting frame of the cutting knife, or to an independent frame, closely following the cutting knife, and immersed in the water; the upper portion of the open end of the net being supported, at or near the surface of the water, by any suitable means to keep the net open and permit the cut kelp to drift into the net, as the boat and cutting apparatus with net attached moves forward in the water.

The invention consists of the parts and the combination and construction of parts, as hereinafter more fully described and claimed, having reference to the accompanying drawings, in which—

Figure 1 is a plan view of the invention. Fig. 2 is a front elevation of the invention. Fig. 3 is a detail view of the ring and rope attachments. Fig. 4 is a horizontal section through the cutting frame and guides. Fig. 5 is a cross section of the bottom cutter bar showing the cutter bar fingers. Fig. 6 is a vertical longitudinal section through the net. Fig. 7 is a detail plan view of the lower cutter bar.

A represents a self-propelled boat, barge, or other suitable floating object, and 2 is an outrigger or float between which the net 3 is suitably supported so as to present a wide-open mouth to permit the entry and insure the retention of the cut kelp as the barge A is propelled forward through the water. The net 3 is of any suitable strong material and of appropriate size and character. It is of any size mesh suitable to hold the kelp in the net, and may be reinforced lengthwise and circumferentially by ropes or cords 4. The mouth of the net may be provided with rings 5 adapted to be passed over the hooks 6 placed on the back of the sliding cutter-frame 7. The outrigger 2 is connected in any appropriate manner to the vessel A, shown by the cross-pieces 8 and gang plank 8'; there being sufficient clearance for the net underneath. The cutter-frame 7 is adapted to slide up and down in vertical guides 9 suitably supported in parallelism and arranged so that the cutter-frame 7 may be lowered to any desired depth into the water, so as to submerge or partially submerge the net, or to be lifted out of the water when it is desired to discharge the net. For convenience the frame 7 is made rectangular in shape, as shown in Fig. 2, and is provided with a ring and chain arrangement 10 at the top for connection with the suitable points 11 carried on, and operated from the boat A.

Any appropriate form of guiding mechanism may be employed. In the present instance I have shown a cutter 12 consisting of an endless band-saw passing around suitable direction pulleys 13 at the corners of frame 7, and thence to a power operating wheel 14 on the boat. This cutter passes down one side of frame 7 and up the other in suitable guides 15, as indicated in Fig. 4, while the horizontal guiding edge at the bottom of the frame is adapted to coöperate with the guards 16. The band-saw thus serves not only to cut the kelp in advance of the net, but prevents the kelp at the sides from fouling the cutting and gathering mechanism. Whenever the net is to be raised out of the water, the saw 12 is disconnected from the wheel 14 whereupon the cutter frame and net may be readily raised and lowered.

17 are suitable floats attached to the upper part of the net at various points, and 18 are weights to keep the net suitably opened out for use; the rear end of the net being suitably spread and maintained in proper open position by any appropriate means connected by the guide lines 19.

Kelp on exposure to the air exudes moisture from every cell and pore, and when torn and bruised, loses portions of its contained moisture even in water; this exuded moisture is a saturated solution of almost pure potassium chlorid, and to avoid these losses, it is necessary to keep the kelp under water, and prevent as much as possible, bruising and crushing the same. This is accomplished by the use of the net 3, which when filled with kelp, constitutes a yielding mass immersed in the water, keeping it from the air, and preventing the losses mentioned.

The large bodies of kelp available for industrial purposes are all in semi-exposed positions on rocky uneven bottoms and before rocky and precipitous shores. The water in and around these beds is in constant motion through a heavy ground swell or wave.

In using barges for the handling and transportation of the kelp, strong tugs are required, requiring a large expenditure for the tugs, for the barges themselves, the labor of men to handle them, and the machinery on same, besides the danger of losing same in storms, and consequently the increased insurance, and expense, in addition to which is the additional expense of unloading the kelp from barges at the wharf, or point of transfer to the factory or point of transshipment for commercial purposes. These expenses, the use of strong tugs, and the danger of loss, and much of the equipment is to a great extent done away with, by the use of my reinforced net. By the use of nets, the necessity for the use of heavy unwieldy barges is avoided, and much lower powered boats can be used for the cutting, and towing of the nets filled with kelp. A large amount of time in harvesting the kelp is saved by using nets, as the cutting boat is only stopped from operating during the time required to disconnect the fil'd net, (after the open end is drawn together and fastened), and leaving same afloat, and to connect an unfilled net in its place.

If kelp after being cut, gets loose by accident, or storms, and drifts upon the beach, it loses its value in ratio to the amount of sand it accumulates. This is generally from 20% to 40% of its own weight, according to weather conditions. This sand will not shake off or wash off, as the sodium alginate which immediately covers the kelp when exposed to air is like glue, and practically water-proof, and this necessitates additional expense in the following treatment, as well as the expense of gathering same up and transporting it. By using the nets, this is to a large extent avoided, as if a net filled with kelp goes ashore, only a small part of the kelp comes in contact with the sand, and by attaching a line to same, it can be pulled off into deep water and towed to its destination with small expense.

After cutting the kelp and towing same inclosed in the nets to the point of unloading the nets, this unloading can be done by using any suitable hoisting, or elevating apparatus, hosting the entire load inclosed in net to a sufficient height to permit dumping from the net into bins or other receptacles provided for same. This is accomplished by opening the front or open end of the net, attaching same to an edge of the bin or receptacle mentioned, attaching a line from the winch, or other suitable hoisting apparatus, to the back, or closed end of the net, and hoisting same, which action causes the load of kelp to be discharged from the net into the bin or receptacle mentioned, without any manual handling.

Having thus described my invention what I claim and desire to secure by Letters Patent is—

1. A device for harvesting and storing sea kelp in a submerged state consisting of a substantially horizontally disposed foraminous receptacle having one end open, means to connect said receptacle alongside a vessel to retain the receptacle submerged and to cause the receptacle to partake of the vessel movements, and cutting mechanism mounted adjacent to the open end of the receptacle and operable from the vessel.

2. In a kelp harvester, a pair of spaced vertical guides, means to support said guides alongside a vessel, a frame mounted in the space between said guides and movable vertically thereon, an open-mouthed net, means to attach the mouth of said net to said frame, cutting mechanism carried by the frame and disposed adjacent to the mouth of the net, means connected to the frame for raising and lowering same and therewith the net from the vessel, and means to actuate the cutting mechanism from the vessel.

3. In a kelp harvester, guiding means, means to support said guiding means alongside a vessel, a frame movable vertically in said guiding means, cutting mechanism on the frame, and a net having an open mouth removably attached to the frame and movable therewith.

4. In a kelp harvester, guiding means, means to support said guiding means alongside a vessel, a frame movable vertically in said guiding means, an endless cutter in connection with said frame traversing the bottom and each of the two sides of the frame, and means to operate the cutter from the vessel, a net having an open mouth removably connected to the frame, and means whereby the frame and therewith the net can be raised or lowered from the vessel.

5. A device for harvesting and storing sea kelp in a submerged state consisting of a substantially horizontally disposed foraminous receptacle having one end open, means to connect said receptacle alongside a vessel to retain the receptacle submerged and to cause the receptacle to partake of the vessel movements, and cutting mechanism mounted adjacent to the open end of the recépacle.

6. In a kelp harvester, a submerged foraminous receptacle having an open mouth, means to support the receptacle from a vessel, and cutting means arranged adjacent the mouth and traversing the bottom and each of the sides thereof.

In testimony whereof I have hereunto set my hand in the presence of two subscribing witnesses.

SEWELL A. KNAPP.

Witnesses:
JOHN H. HERRING,
W. W. HEALEY.